United States Patent

Elerath

[15] 3,637,398

[45] Jan. 25, 1972

[54] PREPARATION OF PARTICULATE MATTER FOR FREEZE DRYING

[72] Inventor: Byron Everett Elerath, Mountain Lakes, N.J.

[73] Assignee: General Foods Corporation, White Plains, N.Y.

[22] Filed: Jan. 14, 1969

[21] Appl. No.: 791,157

[52] U.S. Cl. ........................................99/71, 34/5, 62/270, 99/22, 99/73, 99/75, 99/77, 99/103, 99/105, 99/193, 99/197, 99/205
[51] Int. Cl. .........................................................A23f 1/08
[58] Field of Search..................99/65, 71, 72, 73, 192, 193, 99/197, 199, 236, 22, 75, 77, 103, 105, 205; 34/5; 62/270

[56] References Cited

UNITED STATES PATENTS

| | | | |
|---|---|---|---|
| 2,751,687 | 6/1956 | Colton | 34/5 |
| 3,244,533 | 4/1966 | Clinton et al. | 99/71 |
| 3,373,042 | 3/1968 | Elerath et al. | 99/71 |
| 3,408,919 | 11/1968 | Guggenheim | 99/192 X |
| 3,443,963 | 5/1969 | Simon et al. | 99/71 |
| 3,468,672 | 9/1969 | Schartzberg | 99/71 |
| 3,449,129 | 6/1969 | Reimus et al. | 99/71 |
| 3,482,990 | 12/1969 | Pfluger et al. | 99/71 X |
| 3,495,522 | 2/1970 | Muller | 99/236 |
| 2,292,447 | 8/1942 | Irwin, Jr. | 99/199 X |
| 2,431,496 | 11/1947 | Natelson et al. | 99/71 |
| 2,509,681 | 5/1950 | Flosdorf | 99/206 |
| 3,309,779 | 3/1967 | Ginnette et al. | 34/5 |
| 3,419,399 | 12/1968 | Earle, Jr. et al. | 99/71 |

OTHER PUBLICATIONS

Tea and Coffee Trade J. (1953) Sept. page 23

*Primary Examiner*—Dennis E. Talbert, Jr.
*Attorney*—Gerald E. Jacobs and Bruno P. Struzzi

[57] ABSTRACT

A new method of preparing an extract for freeze drying has been discovered which produces particles of improved appearance in that they are more uniform and have a desirable shape and color. Preparation of frozen particles via the method of this invention is simplified and freeze drying efficiency is increased. The particles are prepared by slush freezing an extract (e.g. coffee extract) to a hard slush condition (as opposed to a soft slush condition) wherein the slush has an ice crystal content of from 20 to 60 percent by weight of the slush and the slush has a viscosity such that it can not be readily spread on a flat surface and will not tend to run or spread after extrusion, extruding the slush in a desired shape into a cold gaseous atmosphere having a temperature below the eutectic point of the extract, cutting the extruded slush and completely freezing the particles prior to freeze drying.

7 Claims, No Drawings

PREPARATION OF PARTICULATE MATTER FOR FREEZE DRYING

BACKGROUND OF THE INVENTION

This invention relates to an improved method for freezing fruit and vegetable extracts preparatory for freeze drying. More particularly it concerns the formation of an extrudable slush which can be readily cut into particulate pieces suitable for use in a freeze drying system. As used herein, cutting refers to any means of subdividing the extruded shapes such as slicing or grinding.

Extracts as used herein refer to a water solution of soluble solids extracted from fruits, vegetables and other plant products. Typical extracts would be orange juice and coffee percolate.

In U.S. Pat. No. 3,373,042 issued Mar. 12, 1968 a method of freezing coffee extract was disclosed wherein an aroma bearing extract was conductively cooled to below its ice point in a first cooling zone to partially freeze water to an extent wherein said extract would retain its shape and form on standing, said partially frozen extract being exposed to a second conductive cooling zone to completely chill the extract below its eutectic point, thus completing the freezing step. In commonly assigned pending application, Ser. No. 763,345 filed on Sept. 27, 1968, it was disclosed that extract could be slushed and finally frozen by means other than conductive cooling. In the work reported thus far, while a slush was formed in the first cooling zone which could retain a preformed shape, the slush was a soft slush which could be spread out on some type of belt in the second cooling zone in order to complete the freezing. Belt freezing is the most common method of freezing now practiced in commercial freeze drying plants wherein the product to be freeze dried is an extract. While this method of freezing has proven commercially feasible it has many disadvantages, e.g., high equipment costs, the need for cumbersome equipment which occupies a large portion of the manufacturing plant and constant supervision by processing personnel. Thus, it may be readily seen that the slush produced in the prior art is most readily adaptable to a belt freezing system which significantly adds to the complexity and cost of a freeze drying installation.

SUMMARY

It has now been discovered that a fruit or vegetable extract can be prepared in the form of a hard slush and that the hard slush can be extruded in the form of ribbons which retain their shape and can be easily frozen before or after cutting without the necessity of using belt freezers. Typically the final freezing can be accomplished by extruding the ribbons into a cold gaseous atmosphere at a temperature below the eutectic point of the extract. The gas used can be air but also it may be an inert gas which may afford additional protection to volatile aromatic constituents.

As used herein the term hard slush is intended to describe a mixture of concentrated extract and water ice wherein the ice has been frozen out of the original extract and the viscosity of the slush formed is such that it cannot be readily spread on a flat surface (e.g., a freezing belt). However, the hard slush can be extruded in ribbon form such that the ribbons will not tend to run or spread after extrusion.

The term ribbons as used herein is meant to describe any form such as ropes, rods, bars, etc., which can be continually discharged from an extruder. One of the many advantages of this invention is that two dimensions of the final product can be uniformly formed on extrusion. The third dimension of the final particulate matter to be freeze dried is controlled by the means of cutting selected. The process of this invention eliminates the need for complex and costly belt freezing systems.

DESCRIPTION OF THE PREFERRED EMBODIMENT

A preferred embodiment of this invention is to continually freeze an extract containing 20 to 45 percent solids by weight of the extract in a continuous manner in order to produce frozen particulate matter suitable for freeze drying. A continuous system is preferred so that the slush being formed (mixture of extract and water ice) can be constantly agitated and moved in a homogeneous mass through an extruder. It has also been found that small ice crystals are more desirable than large ice crystals in practicing this invention, as with a given percentage of ice crystals in the slush, a harder slush is apparently obtained with the smaller ice crystals. Therefore, in practicing this invention a continuous scraped surface heat exchanger such as that manufactured by the Votator division of Chemtron has proven very satisfactory.

The slush formed in the heat exchanger is forced through an extruder. The discharge end of the extruder is a die with openings which conform to the desired product shape. It is necessary in practicing this invention to produce a hard slush, such that it will retain its shape after extrusion and be very nearly in a completely solid condition. It has been found that the ice content may be varied from about 20 to 60 percent by weight of the slush when the extract concentration varies from about 20 to 45 percent solids by weight of the initial extract. The desired degree of hardness will result from a combination of increasing viscosity due to the ice crystals being formed and the increasing viscosity of the concentrated extract which constitutes the liquid phase of the slush. Normally the higher the initial solids content in the extract being frozen, the smaller the amount of ice which must be crystallized in order to form a hard slush.

The range of concentrations of 20 to 45 percent solids in the initial extract was chosen for a variety of reasons. The upper limit was selected such that it is sufficiently below the eutectic composition of the extract to permit enough water to be crystallized out in the form of ice to obtain the necessary hard slush. The eutectic composition will vary for different extracts, but for fruit and vegetable extracts said composition is generally above about 70 percent solids by weight of the extract. Therefore, by limiting the extract concentration to an upper limit of 45 percent, it is possible to freeze out enough water in the form of ice crystals such that the ice content of the slush is at least 20 percent. A lower limit of extract concentration of 20 percent was selected in order to avoid having to freeze an excessive amount of ice in order to obtain a hard slush. For most extracts, it is believed that 60 percent ice in the slush will give a satisfactory hard slush wherein the free liquid contains about 50 percent solids by weight of the extract. If one were to start with 20 percent extract and form a slush containing 60 percent ice, the solids concentration in the liquid portion of the slush would be 50 percent. Also, as a practical matter an initial solids content of less than 20 percent would be undesirable economically since the object of this invention is to produce a product suitable for freeze drying. Freeze drying is an expensive form of dehydration and for most products it would be uneconomical to attempt to freeze dry an extract containing less than about 20 percent solids.

The hard slush is extruded in the form of continuous ribbons which may be cut before or after additional freezing. A preferred technique is to slice the ribbons into desirable lengths as they are discharged from the extruder and to allow the pieces thus formed to fall through a cold air tunnel in order to completely freeze the pieces to below the eutectic point of the extract.

An alternative method would be to allow the ribbons to completely freeze in a cold air stream and then pass the frozen ribbons through a cutter or grinder. This latter technique will produce particles with a more random size distribution and shape and may be desirable for some products. The shape of the pieces can also be varied by varying the shape of the openings in the extruder die as well as the size of the openings in the die.

An additional advantage of this invention is that the texture and color of the particle surfaces can be varied. This can be done by allowing a surface thawing of the ribbons in the extruder die head. On such products as coffee extract this surface thawing can result in a darker color. The surface appearance can also be changed by plating the ribbons of slush as they are extruded. A water spray for example would tend to quickly freeze on the surface of the ribbons and prevent potentially tacky particles from sticking to each other. An extract spray would tend to have the same advantages as the water spray and in addition can effect the color and appearance of the dry particles. Alternatively, the slightly tacky surface of the extruded ribbons could be coated with dry product in order to achieve unique surface effects.

This invention also offers the possibility of several processing advantages in freeze drying. For example, the shape of the die opening can be irregular in order to achieve particles with a maximum surface area. The greater surface area should result in an increased drying rate and thus increase the productivity of a freeze dryer. Also, the shape of the extruded pieces could be varied to obtain a final dried product with a specific, desired density. Density control may also be achieved by foaming the extract prior to forming the slush or by foaming the hard slush prior to extrusion.

This invention will be further described by reference to the following examples.

EXAMPLE I

Coffee extract containing 25 percent solids by weight of the extract was chilled in a continuous scraped surface, heat exchanger. The resultant slush was chilled to a temperature of 20° F. prior to extrusion. This slush was found to be a hard slush suitable for extrusion and contained 44 percent ice by weight of the slush. The liquid portion of the slush had a concentration of 44.5 percent solids by weight of the liquid. The slush was extruded in the form of 1/16-inch rods into an atmosphere of −30° F. air. The rods were cut with an oscillating wire to produce 1/16 to ⅛-inch long pieces. These pieces were thoroughly frozen to −30° F. and collected in a hopper. The frozen pieces were then loaded into trays and freeze dried at a vacuum of less than 500 microns of mercury to a moisture content of 2.5 percent. The resultant product was very regular in appearance, easily handled in packing operation, and essentially free of dust.

EXAMPLE II

Coffee extract containing 25 percent solids was freeze concentrated to produce an extract containing 35 percent solids by weight of the extract. The concentrated extract was then treated as in example I. The slush was chilled to a temperature of 15° F. and the resultant hard slush contained 30 percent ice crystals by weight of the slush. The solids concentration of the liquid portion of the slush was 50 percent.

It should be noted that a hard slush in this example was attained with only 30 percent ice as compared to 44 percent ice in example I because the solids concentration of the initial extract was greater.

The resultant dry product was again found to be very uniform and easily handled in packing operations.

The foregoing examples are for illustrative purposes only and the scope of the invention is to be limited only by the appended claims.

I claim:

1. A method of preparing coffee extract for freeze drying comprising chilling the extract to below 32° F. but above its eutectic point, said extract having from 20 to 45 percent solids by weight of the extract; further chilling said extract to form a hard slush having an ice crystal content of from 20 percent to 60 percent by weight of the slush and having a viscosity such that it cannot be readily spread on a flat surface; extruding said hard slush into a cold gaseous atmosphere having a temperature below the eutectic point of the extract in the form of continuous ribbons of desired dimension, which ribbons will retain their shape and will not tend to run or spread after extrusion; cutting the extruded ribbons of hard slush and freezing the extruded hard slush to below the eutectic temperature of the initial extract.

2. The method of claim 1 wherein the ribbons are sliced into desired lengths as they are discharged from the extruder.

3. The method of claim 1 wherein the extruded ribbons of hard slush are plated as they are extruded, the plating material being selected from the group consisting of water, coffee extract and dried coffee extract.

4. The method of claim 3 wherein the extruded ribbons are sprayed with water as they are extruded.

5. The method of claim 3 wherein the extruded ribbons are sprayed with coffee extract as they are extruded.

6. The method of claim 3 wherein the extruded ribbons are coated with previously dried coffee extract as they are extruded.

7. The method of claim 1 wherein gas is introduced into the extract to form a foam.

* * * * *